(12) United States Patent
Anderson et al.

(10) Patent No.: US 8,762,667 B2
(45) Date of Patent: Jun. 24, 2014

(54) OPTIMIZATION OF DATA MIGRATION BETWEEN STORAGE MEDIUMS

(75) Inventors: Dale H. Anderson, Tucson, AZ (US);
Philip M. Doatmas, Phoenix, AZ (US);
Michael R. Groseclose, Jr., Tucson, AZ (US); Paul A. Jennas, II, Tucson, AZ (US); Larry Juarez, Tucson, AZ (US);
Brian S. McCain, San Jose, CA (US);
David Montgomery, Tucson, AZ (US);
Jason L. Peipelman, Tucson, AZ (US);
Joshua M. Rhoades, Tucson, AZ (US);
Todd C. Sorenson, Tucson, AZ (US);
David V. Valverde, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 12/697,989

(22) Filed: Feb. 1, 2010

(65) Prior Publication Data
US 2011/0191556 A1 Aug. 4, 2011

(51) Int. Cl.
*G06F 13/00* (2006.01)
*G06F 13/28* (2006.01)

(52) U.S. Cl.
USPC ........... 711/162; 711/161; 711/165; 711/170; 711/E12.103

(58) Field of Classification Search
None
See application file for complete search history.

(56) References Cited

U.S. PATENT DOCUMENTS

| | | | |
|---|---|---|---|
| 5,313,631 A | 5/1994 | Kao | |
| 5,375,232 A | 12/1994 | Legvold et al. | |
| 5,602,936 A | 2/1997 | Green et al. | |
| 6,434,682 B1 * | 8/2002 | Ashton et al. | 711/162 |
| 7,251,661 B1 | 7/2007 | Reed et al. | |
| 7,460,383 B2 | 12/2008 | Fukuda et al. | |
| 2004/0255026 A1 * | 12/2004 | Blount et al. | 709/226 |
| 2005/0010609 A1 | 1/2005 | Katoh et al. | |
| 2008/0183774 A1 | 7/2008 | Otani et al. | |
| 2009/0059674 A1 | 3/2009 | Fukuda et al. | |
| 2009/0216945 A1 | 8/2009 | Shimada | |

FOREIGN PATENT DOCUMENTS

| | | |
|---|---|---|
| EP | 1826662 A2 | 8/2007 |
| JP | 2007199576 | 8/2007 |
| WO | 2009/102425 A1 | 8/2009 |

OTHER PUBLICATIONS

John Wilkes, Richard Golding, Carl Staelin, and Tim Sullivan, "The HP AutoRAID hierarchical storage system", Feb. 1996, Hewlett-Packard Laboratories, ACM Transactions on Computer Systems, vol. 14, No. 1, pp. 4, 15, and 25 http://www.hpl.hp.com/research/ssp/papers/AutoRAID.TOCS.pdf.*
International Search Report for counterpart PCT Application No. PCT/EP2011/050141, mailed Apr. 6, 2011.

(Continued)

*Primary Examiner* — Eric S Cardwell
(74) *Attorney, Agent, or Firm* — Griffiths & Seaton PLLC

(57) ABSTRACT

In one embodiment, pursuant to migrating the data from the first to the second storage medium, the data is allocated to the second storage medium while retaining an allocation of the data in the first storage medium. If the data is migrated from the second storage medium back to the first storage medium, the data is pointed to the allocation of the data in the first storage medium to alleviate data movement from the second storage medium to the first storage medium. If the allocation of the data in the first storage medium is determined to be needed for other data, the allocation of the data in the first storage medium is freed.

12 Claims, 3 Drawing Sheets

(56) References Cited

OTHER PUBLICATIONS

Heeseung Jo et al., "SSD-HDD-Hybrid Virtual Disk in Consolidated Environments," Aug. 25, 2009, EURO-PAR 2009 Parallel Processing Workshops: HPPC, Heteropar, Proper, ROIA, Unicore, VHPC, Delft, The Netherlands, XP019146126, ISBN 978-3-642-14121-8, pp. 375-384.

* cited by examiner

OPTIMIZATION OF DATA MIGRATION BETWEEN STORAGE MEDIUMS

BACKGROUND OF THE INVENTION

1. Field of the Invention

The present invention relates in general to computers, and more particularly to apparatus, method and computer program product embodiments for allocating and migrating data between pools in a computing storage environment using a tiered architecture.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Current tiered-storage architectures, as described above, include a variety of storage mediums. These may include such media as enterprise disk drives, serial advanced technology attachment (SATA) disk drives, solid state drives, tape drives, and other devices. Data may be migrated between such devices. Placement of certain kinds of data in the appropriate medium may greatly enhance overall performance of the storage environment.

While it is recognized that such placement of data enhances storage performance, the mechanisms whereby data is migrated between storage mediums may be improved. The processes of moving data between storage mediums causes increased workload and bandwidth consumption in the storage environment. A need exists, for example, for a mechanism whereby data may be migrated as needed between storage mediums while reducing overall workload on the system.

Accordingly, and in view of the foregoing, various system, method, and computer program product embodiments for data migration between storage mediums are provided. In one embodiment, by way of example only, a method for data migration between first and second storage mediums of an available plurality of storage mediums in a computing storage environment is provided. In one embodiment, pursuant to migrating the data from the first to the second storage medium, the data is allocated to the second storage medium while retaining an allocation of the data in the first storage medium. If the data is migrated from the second storage medium back to the first storage medium, the data is pointed to the allocation of the data in the first storage medium to alleviate data movement from the second storage medium to the first storage medium. If the allocation of the data in the first storage medium is determined to be needed for other data, the allocation of the data in the first storage medium is freed.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for migrating portions of data (such as by extents) between storage mediums such that space for the data is retained (allocated) on both storage mediums, as opposed to the data segment being freed as is currently performed from the original storage medium from which the data segment is moved.

In one embodiment, the data segments are accessed from which of the storage mediums are determined to be appropriate at any one particular time. If at a future time, the data segments are determined to have changed (for example, one or more characteristics of the data change), and a determination is made that the data segments should be migrated back to the original storage medium, metadata for the data segments may simply be changed to "point" back at the previously allocated space, alleviating any physical data movement. If the data segments are ever written to during an operation while the data segments are outside a target medium, the allocated space in the original medium may then be freed. If the data space is needed by a user or system process on the original medium, the space may also likewise be freed.

Figure 1:
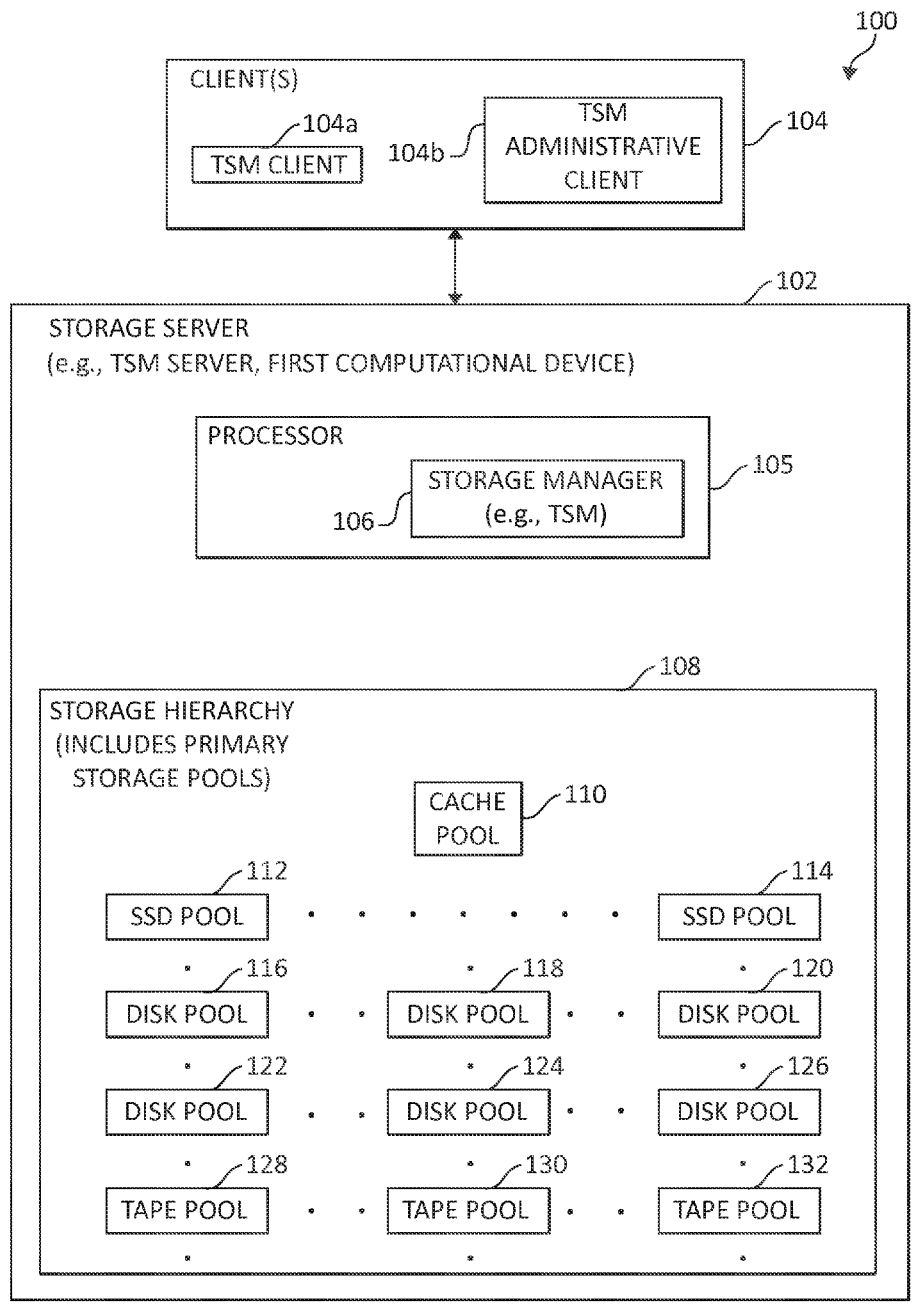
FIG. 1 illustrates a block diagram of an exemplary computing storage environment in accordance with certain embodiments.

Turning now to FIG. 1, a block diagram of a computing storage environment 100 in accordance with certain embodiments is illustrated. The computing storage environment 100 includes a first computational device, such as, a storage server 102, coupled to one or more computational devices, such as, clients 104. In certain embodiments, the storage server 102 and the clients 104 may comprise any suitable computational device, including those presently known in the art, such as, a personal computer, a workstation, a mainframe, a midrange computer, a network appliance, a palm top computer, a telephony device, a blade computer, a hand held computer, etc.

In some embodiments, a storage manager 106, such as, the Tivoli® Storage Manager® (TSM) product marketed by International Business Machines (IBM®) Corporation, may be used for securely storing and managing data segments according to aspects of the present invention. The storage manager 106 may execute in a storage management server, such as a TSM server 102 or elsewhere. In one embodiment, the storage manager is operable by and/or in conjunction with processor device 105 as shown. One of ordinary skill in the art will appreciate that various other configurations of the processor 105, storage manager 106, and related additional processing and/or memory components are contemplated. IBM, Tivoli, and Tivoli Storage Manager are trademarks or registered trademarks of IBM Corporation.

The TSM may provide data storage services to clients, such as TSM clients 104a, for management of data. The TSM server 102 may store files sent to the TSM server 102 by one or more TSM clients 104a. The storage manager 106 and/or processor device 105 may allow a system administrator to configure storage pools, where a storage pool comprises a group of devices used for storing data received from the TSM client 104a. Storage pools are used as targets for store operations from the TSM client 104a and are referenced in TSM server policies and other constructs for processing.

As shown, a variety of storage devices may be organized into a storage hierarchy. Storage media within the storage hierarchy may thus be grouped into data structures referred to herein as storage pools. The storage hierarchy may be organized to correspond with one or more metrics, such as a performance metric including write or read speeds. The storage hierarchy 108 as shown may be organized such that the top of the hierarchy may include a cache pool 110 having a highest amount or quality of a particular performance metric. Below the cache pool 110, a number of solid state drive (SSD) class devices may be organized into SSD pools by the same, similar, or other metrics (e.g., SSD pools 112 and 114).

Below the SSD pools 112 and 114, a first tier of disk pools (e.g., disk pools 116, 118, and 120) may be then organized. As one of ordinary skill in the art will appreciate, disk pools 116, 118, and 120 may include a variety of disk devices such as pools of enterprise disk drives, SATA disk drives, disk devices configured in a particular redundant array of independent disks (RAID) configuration, and the like.

The first tier of disk pools may be located above a second tier of disk pools (e.g., pools 122, 124, and 126) by virtue of exhibiting a greater amount, stronger attribute or attributes, or quality of the performance metric. Below the second tier of disk pools, an additional tier of tape pools (e.g., tape pools 128, 130, and 132) may then be organized. Various considerations for the organization of such storage hierarchies 108 may be apparent to one of ordinary skill in the art. In one embodiment, the system administrator may assist in performing such configurations in the storage hierarchy 108 by inputs to the TSM administrative client 104b or another mechanism.

As previously mentioned, the illustrated embodiments provide mechanisms for migration of data between storage mediums such as that found in the storage hierarchy 108. In one embodiment including a tier of disk pools corresponding to enterprise hard disk drives (HDDs) and a tier of disk pools corresponding to a number of SSD devices, pursuant to a data migration from the enterprise HDDs to the SSDs, the data may be left allocated on the enterprise HDDs (original storage medium), while any allocated but unused storage space on the SDDs are freed taking into consideration the higher demand that storage space on SDD devices creates. In this case, if the data is then later migrated back to the enterprise HDDs (if the data had not been written to, and the original space was not later requested, for example), the backwards migration is trivial, requiring no data movement and conserving bandwidth and workload.

Variations of the above exemplary embodiment may be considered. For example, pursuant to a migration from HDD to SSD, after reserving the data segment on the SSD and copying the data from the HDD data segment to the new SSD data segment, the HDD data segment may be marked as "mirroring" the given SSD data segment. If a write operation is performed to the SSD data segment, the mirrored HDD extent may then be freed and the "mirroring" indicator cleared.

Further, if the data space is requested on the HDD (by, for example, a user or a system process such as an Extent Space Efficient volume background allocation), and only "mirrored" space remains (i.e., no other available storage space), then the mirrored data segments may be searched to select one or more to be freed. The selection algorithm may take into account various data characteristics such as the data's read/write ratio, selecting the data segment most likely to be written to in the future. Additionally, the selection algorithm may simply use a First-In, First-Out (FIFO) algorithm considering the oldest mirrored data segments first. Whichever selection mechanism is utilized, the data segment's mirroring indicator may then be cleared and the data segment is then allocated for the new purpose.

If the SSD data segment is backwards migrated to the HDD, and no mirroring relationship is located for the particular SSD data segment, an available data segment may then be found, allocated, and the data migrated to the new data segment. If a mirroring relationship for the SSD segment exists, the metadata of the volume may be updated to indicate the location of the data segment to be the original data segment. In either case, the SSD data segment may then be freed after the HDD data segment takes up the task of accommodating the data.

The mechanism of querying to determine if a mirroring relationship exists may be implemented as a background process, and not necessitating additional interface requirements as one of ordinary skill in the art will appreciate. A user querying available space may, accordingly, be returned a sum of available data segments and data segments determined to be in a mirroring relationship.

In some embodiments, a bitmap may be created for the original storage space (for example, in metadata), with a bit in each arbitrarily sized subsection (such as a track) of the data segment. The space left allocated on the original storage space may then be determined to be allocated or reserved when queried by the user. If the data segment on the migrated storage medium (such as an SSD drive) is written to, the subsection(s) of the data segments may be marked as "dirty" in the metadata bitmap. If the data segment is then migrated back to the original storage medium, the bitmap may then be used to determine which data segments are altered, and thus require physical data migration from the migrated storage medium.

Figure 2:
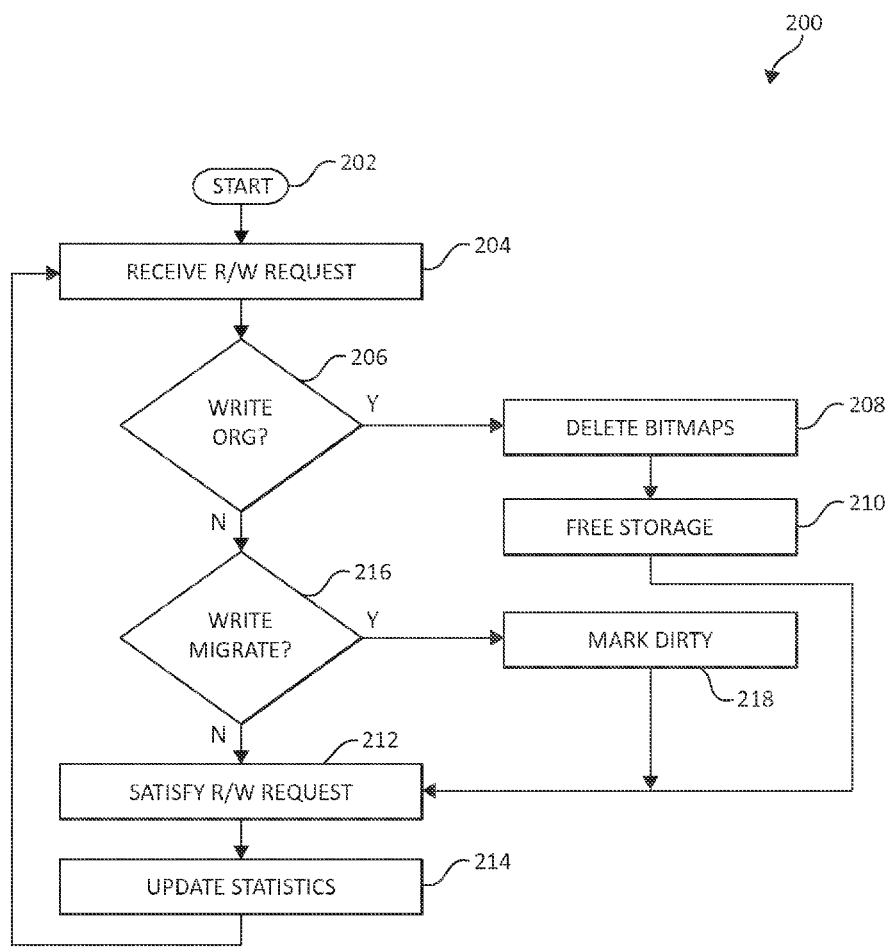
FIG. 2 illustrates a flow chart diagram of an exemplary method for migrating data between storage mediums according to one embodiment of the present invention.
Figure 3:
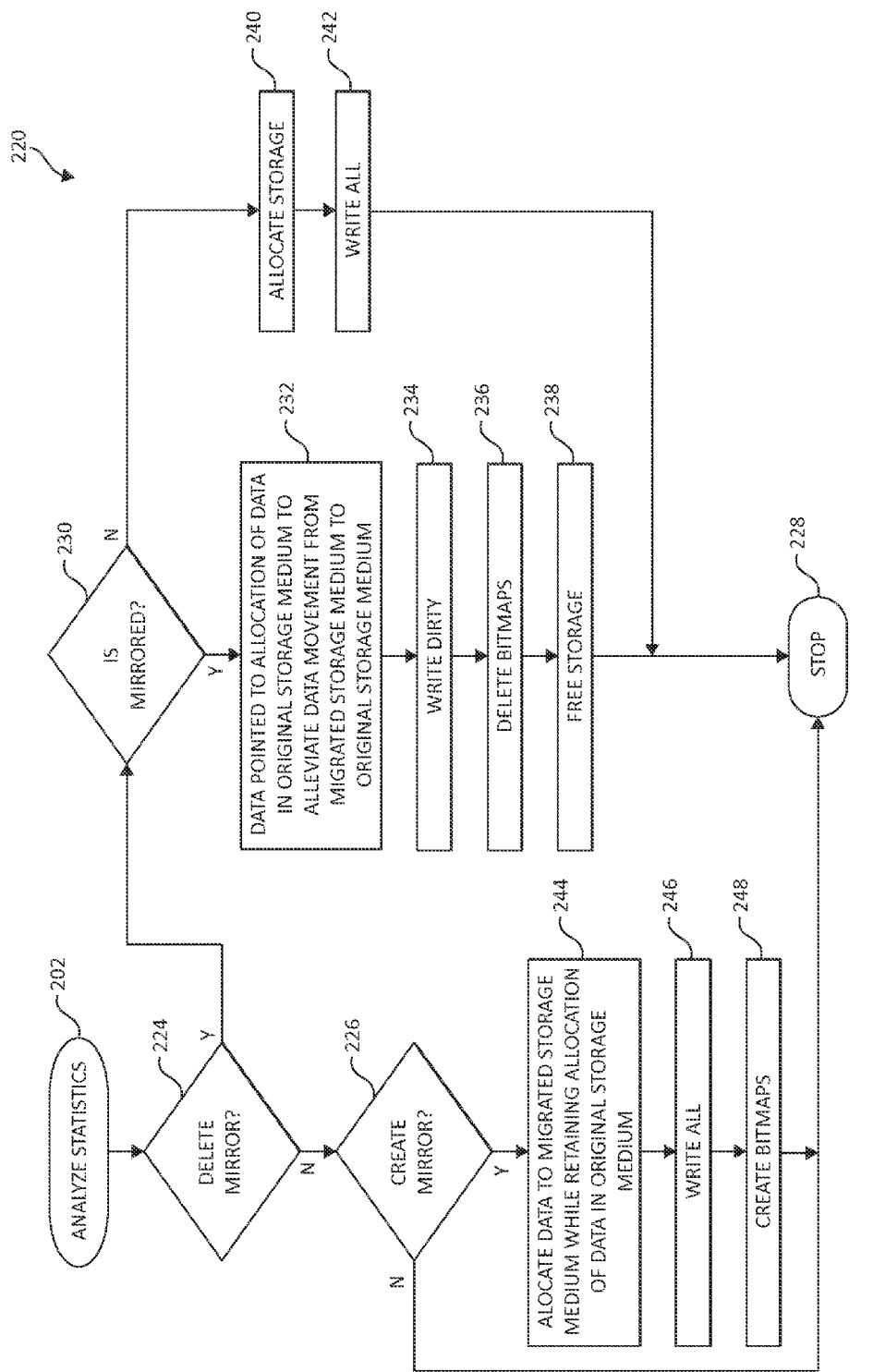
FIG. 3 illustrates an additional flow chart diagram of a further exemplary method for migrating data between storage mediums including a mirror management mechanism.

Turning to FIGS. 2 and 3, following, exemplary methods 200 and 220 for data migration between storage mediums are illustrated in flow chart diagram format. As one of ordinary skill in the art will appreciate, various steps in the methods 200 and 220 may be implemented in differing ways to suit a particular application. In addition, the described methods 200 and 220 may be implemented by various means, such as hardware, software, firmware, or a combination thereof operational on or otherwise associated with the computing storage environment. For example, the methods 200 and 220 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 2, method 200 begins (step 202), with the receipt of a storage request (e.g., a read or write request) in the computing storage environment (step 204). If, pursuant to the write request, the write is to be written in the original storage medium (step 206), indicating that the original allocation of data in the original storage medium is necessary for this new data, then the metadata bitmap(s) corresponding to that data are cleared (step 208), and the previous allocation of storage in the original storage medium is freed (step 210) to accommodate the newly written data on the original storage medium.

Returning to step 204, if pursuant to the write request, the write is to be written in the migrated storage medium (step 216), then those corresponding metadata bits in the original storage medium are marked as dirty (step 218). An exemplary methodology describing the allocation of such storage and creation of such bitmaps is further described, following, in FIG. 3. Following the conclusion of step 210 or step 218, the storage request is satisfied (i.e., the read or write operation is conducted) (step 212), and statistics reflecting the I/O activity previously described are updated (step 214).

These statistics may later form the basis for later considerations of where to put subsequent data, be it on the original storage medium or migrated storage medium. Exemplary statistical data may include read/write ratios, size of the data segment, and the like as one of ordinary skill in the art will appreciate. For example, data having a large number of reads but a lower number of writes may be determined to be a good candidate for SSD storage. Following the conclusion of step 214, the method 200 returns to step 204 to accommodate an additional storage operation.

Turning to FIG. 3, following, an exemplary method 220 for mirror management is provided in consideration with the method 200 previously described. Method 220 begins with the analysis of the statistical information previously described above (step 202). Pursuant to this analysis, a determination may be then made as to whether to manage the mirrored data in some way. If an existing mirror is determined to be necessary to be deleted (for example, a mirror of data on an SSD device determined to no longer necessitate SSD performance) (step 224), then the method 220 confirms that a mirroring relationship exists between the two storage mediums (step 230).

If the data is determined not to be previously mirrored, or/and a mirror is unnecessary, then an available allocation of storage on the appropriate, unmirrored medium (e.g., the original storage medium, for example) is allocated 240, and the corresponding data is written to the allocation (step 242). The method 220 then ends (step 228).

Returning to step 230, if the data is determined to be mirrored (e.g., mirrored on the original and migrated storage medium), and the mirror is to be deleted, then the data is pointed to the allocation in the original storage medium, alleviating physical data movement from the migrated storage medium to the original storage medium (step 232). Pursuant to the migration of the data back to the original storage medium, those bits having been earlier marked as dirty (e.g., step 218, FIG. 2), are then written to the original storage medium, ensuring that an accurate migration is made of the complete data. Any associated bitmaps corresponding to the migrated storage medium (to be deleted) are then deleted (step 236), and the storage in the migrated storage medium is freed (step 238). The method 220 then ends (again, step 228).

Returning to step 202, if the statistical analysis determines that data should be migrated (e.g., data presents statistical information indicating better performance in another storage medium), (step 226), the the data in question (such as one or more extents) are allocated to the migrated storage medium, while an allocation of the data is retained in the original storage medium (step 244). In the depicted embodiment, and pursuant to such data migration following the write of data to the allocation (step 246), the allocation of the data in the original storage medium is then marked as mirrored in the migrated storage medium and a bitmap for the data units of the allocation in the original storage medium is created (step 248). The method 220 then ends (again, step 228)

As one of ordinary skill in the art will appreciate, the methods 200 and 220 may be additionally performed on a scheduled interval in lieu of the storage request previously described. The scheduling may occur pursuant to various implementations of the computing storage environment. For example, the scheduling may coincide with periods of high and/or low storage activity. The scheduling may be configured by a system administrator using the storage manager 106 (FIG. 1) or by other similar means.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for data migration between first and second storage mediums of an available plurality of storage mediums in a computing storage environment, the first and second storage mediums and the available plurality of storage mediums being non-transitory, the system comprising:

a processing device operating a storage manager module operational in the computing storage environment, wherein the storage manager module is adapted for:

migrating the data from the first to the second storage medium, and allocating the data to the second storage medium while retaining an allocation of the data in the first storage medium;

marking a mirroring indicator of the data on the first storage medium as mirroring the allocation of the data in the second storage medium, after the data on the first storage medium has been migrated to the second storage medium;

using a bitmap to track whether space on the first storage medium has already been allocated or reserved; and pursuant to migrating the data from the first to the second storage medium:

a determination is made as to whether the data exists in both the first storage medium and the second storage medium thereby being mirrored, if the data is mirrored and the mirror is to be deleted, the data is pointed to the allocation of the data in the first storage medium to alleviate data movement from the second storage medium to the first storage medium, if a determination is made that only mirrored space remains in the first storage medium, mirrored data segments in the first storage medium are searched to determine whether an allocation of one or more of the mirrored data segments in the first storage medium is needed for other data, wherein to determine whether the allocation is needed for other data is based on a read/write ratio of the one or more mirrored data segments, the one or more mirrored data segments are allocated to a new purpose, and the allocation of the one or more mirrored data segments in the first storage medium is freed by clearing a mirroring indicator associated with the freed allocation of the one or more mirrored data segments, and if the data is mirrored and one of an allocation of the data in the second storage medium and the allocation of the data in the first storage medium is altered, the other one of the allocation of the data in the second storage medium and the allocation of the data in the first storage medium is freed.

2. The system of claim 1, wherein the storage manager module is further adapted for:

marking in the bitmap those of the data units of the allocation of the data in the first storage medium corresponding to data units of an allocation of the data in the second storage medium having been altered as dirty, and upon migrating the data from the second storage medium back to the first storage medium, migrating the marked data units.

3. The system of claim 2, wherein the bitmap is created in metadata.

4. The system of claim 1, wherein the storage manager module is further adapted for, pursuant to determining if the allocation of the data in the first storage medium is needed for other data:

implementing a first-in, first-out (FIFO) methodology, wherein the allocation of the data in the first storage medium is determined to be an oldest allocation.

5. The system of claim 1, wherein the storage manager module is further adapted for determining at a point in time, in view of at least one data characteristic, which of the first and second storage mediums from which to access the data.

6. The system of claim 5, wherein the at least one data characteristic includes a higher number of reads than writes, and the storage manager module is further adapted for, pursuant to allocating the data to the second storage medium while retaining the allocation of the data in the first storage medium, allocating the data to at least one solid state drive (SSD) while retaining an allocation of the data on at least one enterprise hard disk drive (HDD).

7. The system of claim 1, wherein the storage manager module is further adapted for, pursuant to determining the allocation of the data in the first storage medium is needed for other data, selecting a data segment in the allocation of the data in the first storage medium that is most likely to be written to in the future.

8. A computer program product for data migration between first and second storage mediums of an available plurality of storage mediums in a computing storage environment by a processor device, the computer program product comprising a non-transitory computer-readable storage medium having computer-readable program code portions stored therein, the computer-readable program code portions comprising:

a first executable portion for migrating the data from the first to the second storage medium, and allocating the data to the second storage medium while retaining an allocation of the data in the first storage medium;

a second executable portion for marking a mirroring indicator of the data on the first storage medium as mirroring the allocation of the data in the second storage medium, after the data on the first storage medium has been migrated to the second storage medium; and a third executable portion for using a bitmap to track whether space on the first storage medium has already been allocated or reserved, wherein:

a determination is made as to whether the data exists in both in the first storage medium and the second storage medium thereby being mirrored, if the data is mirrored and the mirror is to be deleted, the data is pointed to the allocation of the data in the first storage medium to alleviate data movement from the second storage medium to the first storage medium, and if a determination is made that only mirrored space remains in the first storage medium, mirrored data segments in the first storage medium are searched to determine whether an allocation of one or more of the mirrored data segments in the first storage medium is needed for other data, wherein to determine whether the allocation is needed for other data is based on a read/write ratio of the one or more mirrored data segments, the one or more mirrored data segments are allocated to a new purpose, and the allocation of the one or more mirrored data segments in the first storage medium is freed by clearing a mirroring indicator associated with the freed allocation of the one or more mirrored data segments; and if the data is mirrored and one of an allocation of the data in the second storage medium and the allocation of the data in the first storage medium is altered, freeing the other one of the allocation of the data in the second storage medium and the allocation of the data in the first storage medium.

9. The computer program product of claim 8, further including a fourth executable portion for:

marking in the bitmap those of the data units of the allocation of the data in the first storage medium corresponding to data units of an allocation of the data in the second storage medium having been altered as dirty, and upon migrating the data from the second storage medium back to the first storage medium, migrating the marked data units.

10. The computer program product of claim 8, further including a fourth executable portion for, pursuant to determining if the allocation of the data in the first storage medium is needed for other data:

implementing a first-in, first-out (FIFO) methodology, wherein the allocation of the data in the first storage medium is determined to be an oldest allocation.

11. The computer program product of claim 8, further including a fourth executable portion for determining at a point in time, in view of at least one data characteristic, which of the first and second storage mediums from which to access the data.

12. The computer program product of claim 11, wherein the at least one data characteristic includes a higher number of reads than writes, and further including a fifth executable portion for, pursuant to allocating the data to the second storage medium while retaining the allocation of the data in the first storage medium, allocating the data to at least one solid state drive (SSD) while retaining an allocation of the data on at least one enterprise hard disk drive (HDD).

* * * * *